United States Patent [19]

Brister

[11] 4,314,577
[45] Feb. 9, 1982

[54] INSTALLATION, HYDROSTATIC TESTING, REPAIR AND MODIFICATION OF LARGE DIAMETER FLUID TRANSMISSION LINES

[76] Inventor: Beryle D. Brister, P.O. Box 2329, Amarillo, Tex. 79105

[21] Appl. No.: 55,961

[22] Filed: Jul. 9, 1979

[51] Int. Cl.³ .............................................. F16L 55/12
[52] U.S. Cl. ...................................... 137/13; 137/15; 137/315; 138/97
[58] Field of Search .................... 137/13, 15, 268, 315, 137/DIG. 10; 138/97

[56] References Cited

U.S. PATENT DOCUMENTS

| | | | |
|---|---|---|---|
| 3,695,301 | 10/1972 | Pittman | 138/97 |
| 3,827,282 | 8/1974 | Brister | 138/97 X |
| 3,926,006 | 12/1975 | Brooks | 138/97 X |
| 4,077,435 | 3/1978 | Van Scoy | 138/97 X |

Primary Examiner—Alan Cohan
Attorney, Agent, or Firm—Hubbard, Thurman, Turner, Tucker & Glaser

[57] ABSTRACT

Method and apparatus for installing and testing new pipelines or for testing, repairing or modifying existing pipelines without purging products from the line are disclosed. The method is carried out by selectively sealing the pipeline to prevent the flow of products by means of a pipeline freeze pig which features an expandable chamber which is filled with water. A section of fluid transmission line is sealed by positioning the freeze pig within the interior of the section and positioning a refrigeration unit around the exterior of the section enclosing the freeze pig. The water within the expandable enclosure is frozen by circulating a refrigerant through the refrigeration unit. The freeze pig is characterized by a resilient boot enclosure defining the expandable chamber which is secured to an elongated support member. The resilient boot is disposed between first and second flexible flange members which project radially for wiping engagement with the inner wall surface of the transmission line. The flexible side wall of the resilient boot is radially yieldable in response to the force exerted by the expansion of the freezing volume of water contained within the boot to cause sealing engagement of the flexible side wall portion with the inner wall surface of the transmission line. A component of the transmission line section is isolated by positioning a pair of freeze pigs in the pipeline downstream and upstream relative to the component so that the flow of liquid product through the section is halted. Thereafter the section of pipeline or component lying intermediate the frozen pigs is penetrated in order to perform the modification, repair or replacement.

4 Claims, 9 Drawing Figures

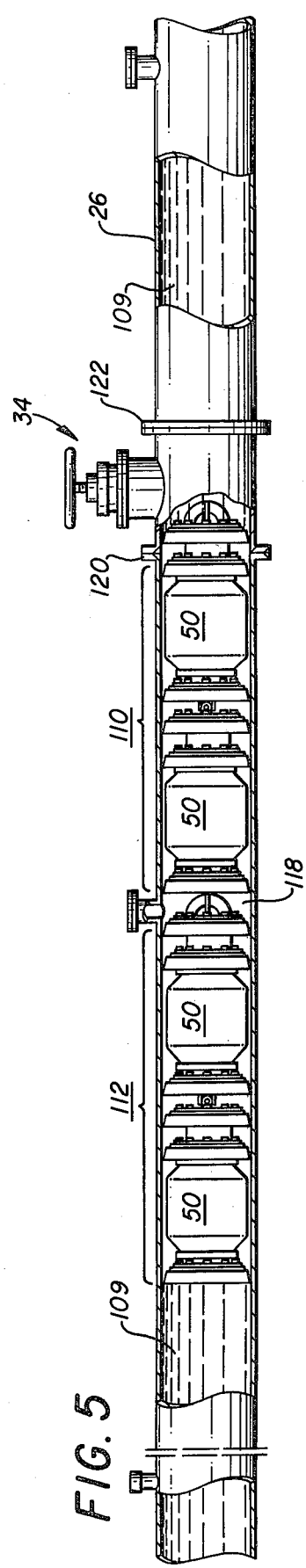
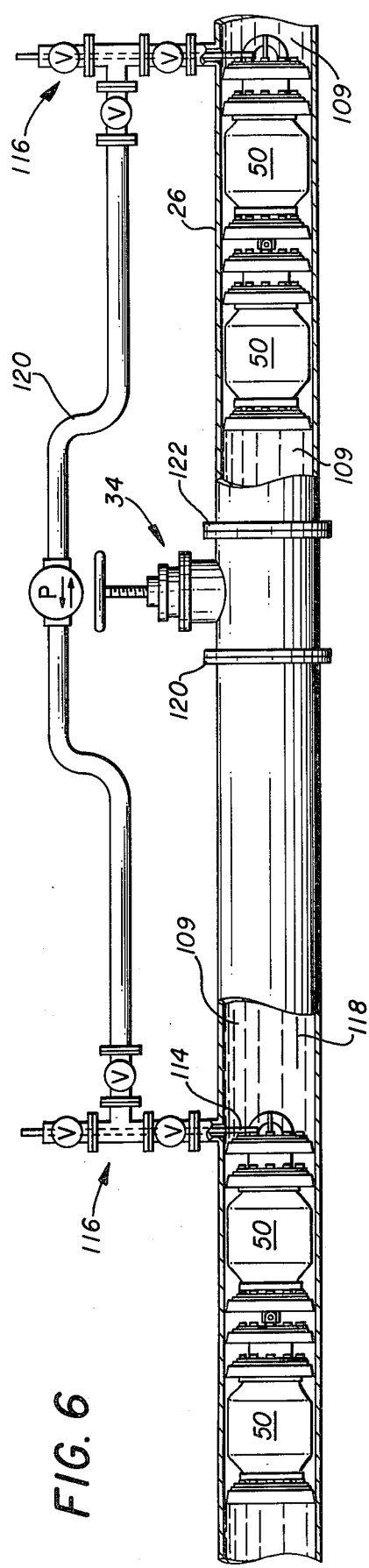
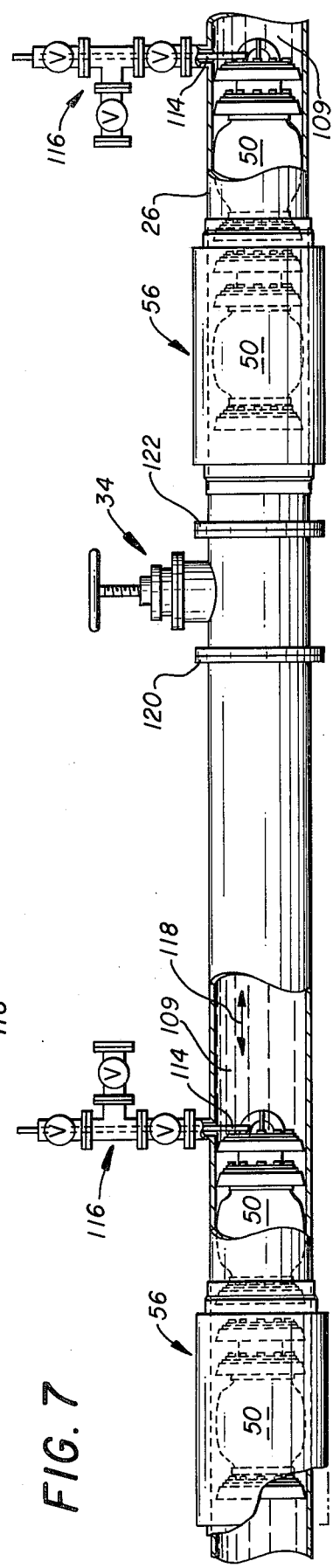
FIG. 5
FIG. 6
FIG. 7

INSTALLATION, HYDROSTATIC TESTING, REPAIR AND MODIFICATION OF LARGE DIAMETER FLUID TRANSMISSION LINES

BACKGROUND OF THE INVENTION

1. Field of the Invention

The present invention relates generally to the maintenance, testing and upgrading of large diameter fluid transmission lines, and in particular, to a method and apparatus for isolating a component such as a main line valve without evacuating the fluid product from the transmission line.

2. Description of the Prior Art

Large diameter pipelines have been used for many years to transport crude oil, gasoline, jet fuel, coal slurry, natural gas and other petroleum derivatives and products, many of which are very flamable and dangerous to the ecology. The liquid products are gathered from the field and are transported through the pipelines to refiniers and processing plants. The finished products from the refineries and processing plants are transported through other pipeline systems over long distances to market.

These pipelines must be operated at high pressures in order to economically transmit large volumes of product. The high operating pressures represent a significant percentage of the maximum pressure which the pipe will withstand before rupture or leak occurs, even if the pipe is in perfect condition. Because of the nature of the products typically transported through a large diameter pipeline, rupture of the pipeline can seriously damage the ecology and endanger human life. New pipelines may leak or rupture for a number of reasons, including faulty manufacture of the pipe, faulty weld joints, or damage to the pipe during transportation or installation. Pipelines which have been in use for some period of time are also subject to leak or rupture due to corrosion.

The typical pipeline is several hundred miles long and is usually divided into sections, each section being separated by a main line valve. Many of the transmission lines have gathering lines for collecting additional product along the route of the principal transmission line. Because of the corrosion and damage which occurs as the liquid product is transported, many of the main line valves or other pipeline components become inoperative. Because of the serious consequences and relatively high likelihood of ruptures and leaks, the components must be repaired before other damage occurs. Furthermore, as different products are transported through the pipeline, modification of the pipeline components is usually required to accommodate new operating conditions such as increased operating pressures. Also, pipeline systems must be updated from time to time in order to comply with minimum safety standards as defined by government regulations.

The maintenance and upgrading of existing pipelines has become increasingly more costly. The principal factors contributing to this increasing cost are labor, equipment and loss of revenue to the operating companies during the shutdown time of the pipeline when repair or modifications are being made. Although the contractors who perform the repair and maintenance have increased their efficiency through the use of improved equipment, the methods of testing, repair and modification have remained basically unchanged. The conventional method for performing upgrading repairs or modifications of liquid product transmission lines is to evacuate the product from the pipeline, cut the line, install test manifolds, locate the component to be repaired or modified, and then install a new component which has been repaired or modified. In performing the conventional repair procedure, it is necessary to shut down the pipeline system for long periods which results in substantial costs to the owner companies, and includes not only the costs of repair and modification, but also the loss of revenue for the time the pipeline is out of service. The shutdown of a major product pipeline may cause the shutdown of the processing plant or a refinery with consequential adverse effects upon markets which are unable to operate without a steady supply of the refined product.

Because of the substantial expense involved and serious impact upon markets which are unable to operate when the pipeline must be taken out of service for a substantial period of time, methods for testing, repairing or modifying existing pipelines are continuously being improved. One such improved method in which a slug of water is utilized instead of test manifolds is disclosed and claimed in U.S. Pat. No. 3,827,282 issued to Beryle D. Brister on Aug. 6, 1974. However, testing, repair or modification of a pipeline according to that improved method requires that the pipeline be taken out of service and the product stripped from the pipeline and displaced by a slug of water. A short section of the pipe containing the slug of water is frozen to seal off the pipeline. Only then can the pipeline be safely tested for leaks or cut to make repairs or modifications. The time required to strip the line, fill it with water, and refill the line with the product after testing or repair is significant and represents a substantial cost. Furthermore, an adequate natural supply of surface water is often unavailable in arid regions.

Although the introduction of a slug of water into a transmission line can be used effectively for certain applications, for example in pipelines which transport crude petroleum or coal slurry, there are a number of applications involving the transportation of refined petrochemical products such as zylene and polypropylene which must be maintained in moisture free conditions to prevent contamination of the liquid product. Also, in artic regions it is important to keep moisture out of the pipeline because frozen residual moisture causes damage to many components such as valves. IIn general, any finished product whether it be diesel, gasoline, jet fuel or natural gas must be kept as dry as possible. Special equipment including dewatering pigs and moisture traps are employed to maintain the pipelines moisture free. Because of the general unavailability of water in arid regions, freezing temperatures in artic regions and because of the necessity to avoid the exposure of some products to moisture, alternate methods must be used to seal the transmission lines for these applications.

SUMMARY OF THE INVENTION

It is a principal object of the present invention to provide method and apparatus for the testing, repair or modification of a product pipeline which eliminates the need for complete evacuation of the pipeline products and substantially reduces the down time of the pipelines, the refineries, the processing plants and does not threaten ecology or safety of nearby communities.

It is an important object of the present invention to provide apparatus and method for testing, modifying or repairing pipelines which can be carried out without purging the line of its products and without displacing the product with large volumes of water.

A further object of the invention is to provide a freeze pig which may be moved through a pipeline by hydraulic or pneumatic pressure and which may be stopped at a desired location in the pipe by external positioning means.

Yet another object of the invention is the provision of a freeze pig having an expandable boot which encloses a sealed chamber filled with water and which is radially yieldable in response to the force exerted by the freezing volume of water contained in the chamber to cause sealing engagement of the boot with the inner wall surface of the transmission line.

Still another object of the invention is the provision of a freeze pig which may be moved through the pipeline by hydraulic or pneumatic pressure and having a resilient boot defining a sealed chamer intermediate radially projecting flange members which cooperate with the interior surface of the transmission line for preventing convection currents of a freezing zone defined by a heat exchanger positioned around the section of transmission line in which the freeze pig is positioned.

An important object of the invention is the provision of a method for positioning and restraining a pipeline pig on either side of a pipeline component which is to be repaired, modified or replaced.

A still further object of the invention is to provide a method for sealing a section of a fluid transmission line by positioning a freeze pig having a resilient boot filled with a fluid which expands upon freezing within the section of pipeline to be sealed, positioning a heat exchanger around the transmission line and freeze pig, and freezing the liquid solution within the resilient boot by introducing a refrigerant into the heat exchanger to cause the sides of the boot to expand and cause sealing engagement of the boot with the inner wall surface of the transmission line.

The foregoing objects are achieved by means of a freeze pig which is, characterized by a resilient boot defining a sealed chamber which is radially yieldable in response to the force exerted by the expansion of a freezing volume of liquid solution such as water contained within the chamber. The freeze pig is positioned by propelling it with hydraulic or pneumatic pressure through the fluid transmission line section to be sealed. A heat exchanger or other suitable refrigeration means is positioned around the section of fluid transmission line enclosing the pig. The expandable boot is pressurized to provide sliding engagement of the exterior boot surface with the interior of the transmission line. Refrigerant is introduced or circulated through the heat exchanger to cause the liquid solution to freeze and expand, thereby exerting a sealing force through the boot against the interior of the transmission line.

The resilient boot is preferably secured to an elongated support member intermediate first and second resilient flange members which project radially for wiping engagement with the inner wall surface of the transmission line. This arrangement defines a sealed isolation chamber around the exterior of the boot and prevents the establishment of convection currents outwardly of the freeze zone thereby substantially reducing the time required to freeze the expandable liquid within the boot.

According to an important aspect of the method of the invention, a pair of freeze pigs each having a resilient expandable boot are propelled through a transmission line until the loading freeze pig engages the gate of a partially closed main line valve. The trailing freeze pig is restrained against further movement through the transmission line by means of a pig stop valve and pig stop rod which are located at a measured distance with respect to the center line of the main line valve. Thereafter, the gate of the main line valve is fully opened to permit the passage of the leading freeze pig. A second pig stop valve and pig stop rod assembly is positioned in the pipeline at a measured distance on the downstream side of the main line valve. Product pumped from downstream of the main line valve is discharged into the pipeline ahead of the trailing freeze pig which is restrained against further movement. The pressure exerted by the product as it is pumped into the intervening pipeline space propels the leading freeze pig through the transmission line and past the main line valve until it is restrained by engagement with the downstream pig stop rod.

Thereafter, the upstream pig stop valve is closed to maintain pressure on the downstream freeze pig. Suitable refrigeration units are secured around the pipeline over the leading freeze pig and over the trailing freeze pig to freeze the water in the expandable boot of each freeze pig and seal the pipeline interior on either side of the main line valve. The foregoing operations are all carried out without removing the product from the transmission line. The isolated section of pipeline lying intermediate the seals established by the frozen pigs is penetrated by a tool for performing the modification, repair or replacement of the component valve.

The novel features which characterize the invention are defined by the appended claims. The foregoing and other objects, advantages and features of the invention will hereinafter appear, and for purposes of illustration, but not of limitation, an exemplary embodiment of the freeze pig apparatus of the invention and of a pipeline system in which the method of the invention may be practiced is shown in the appended drawing.

BRIEF DESCRIPTION OF THE DRAWING

FIG. 5 is an elevation view, partly in section, of a pipeline section in which freeze pigs are disposed;

FIG. 6 is a view similar to FIG. 5 which illustrates a preferred method for positioning the freeze pig on opposite sides of a main line valve;

FIG. 7 is a view similar to FIG. 6 which illustrates the placement of refrigeration units around the pipeline sections containing the freeze pigs;

DETAILED DESCRIPTION OF A PREFERRED EMBODIMENT

Figure 1:
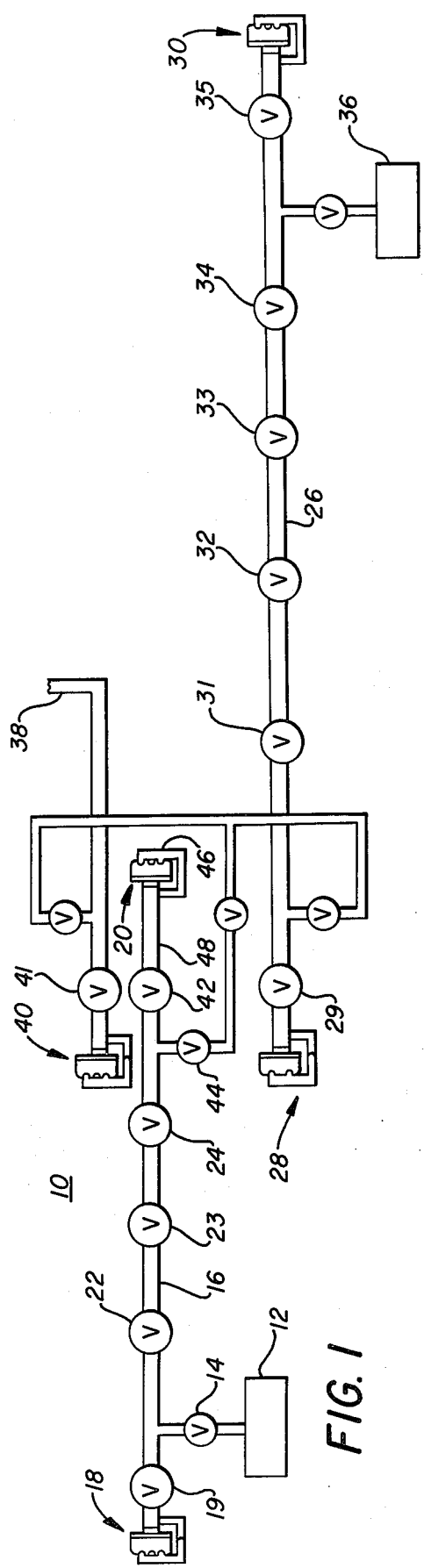
FIG. 1 is a schematic diagram of a typical pipeline system through which products are transported.

For purposes of illustration, the invention will be explained with reference to small-to-medium diameter pipelines. However, the diameter of the pipeline does not impose a limitation upon the practice of the method of the invention or upon the construction of the apparatus of the invention. The method and apparatus of the invention may be practiced with a pipeline of any practical size, including small diameter lines such as used in chemical plants, or very large diameter lines, for example sixty inch diameter pipelines which are used for transporting crude petroleum.

In the description which follows, like parts are marked throughout the specification and drawing with the same reference numerals, respectively. The drawing figures are not necessarily to scale and in some instances portions have been exaggerated in order to more clearly depict certain features of the invention.

Referring now to the drawing, a simplified fluid transmission system is indicated generally by the reference numeral 10 in FIG. 1. The system 10 includes a gathering station or pumping station 12 for pumping fluid products, typically crude oil, natural gas or refined petroleum products such as gasoline, jet fuel or the like, from the gathering station to a receiving station. Fluids from the pump station 12 are passed through a valve 14 to a pipeline 16 having launcher receivers 18, 20 and main line valves 22, 23 and 24. A second pipeline 26 has launcher receivers 28, 30 at each end and main line valves 29, 31–35. A receiving station represented at 36 may be another pump station, a refinery, a distribution terminal or the like. A branch pipeline 38 terminates in a launcher receiver 40. The pipeline 26 may be up to sixty inches or more in diameter and of welded construction. Additional launcher-receivers may be located along the pipelines 16, 26 and 38 as needed. The terminal valves 19, 29, 31, 41 and 42 are connected in fluid communication intermediate the launcher receivers 18, 20, 28, 30 and 40, respectively, and the associated pipeline sections 16, 26 and 38 to facilitate launching and receiving operations.

The three launcher-receivers 20, 28 and 40 may be interconnected to either launch or receive pipeline pigs. The launcher-receivers 20 and 40 will typically be used to receive pipeline pigs. The launcher-receiver 28 will typically be used to launch a pipeline pig. A pipeline pig may be launched from the launcher-receiver 28 by closing terminal valves 42 and 44, opening the end closure means 46 and inserting a pipeline pig into the throat of the pipeline tube section 48.

The gathering system 10 of FIG. 1 may be several hundred miles in length. For example, pipeline section 16 may be eight inches in diameter and may start at an oil field in New Mexico. The pipeline 38 may come from an oil field in West Texas and may also be eight inches in diameter, and may extend several hundred miles across the state of Texas to a refinery on the Gulf Coast. The principal product carried by the system 10 may be crude oil. The normal operating pressures of the system might be as high as 700 to 1,500 PSI.

According to conventional methods for performing testing, repairs or modifications to a component such as the main line valve 34, it is standard practice to completely evacuate the product from the pipeline, cut the pipeline and install test manifolds which seal off the line and then apply pressure to the line to test for leaks or alternately penetrate the line to perform the repair or modification. Another prior art method is to displace the liquid product with a water solution and freeze a short section of the water to form a freeze plug to seal the line. In the prior art method for testing the pipeline system 10 for leaks, it is necessary to shut down the station 12 and to bring the pipeline 16 to zero pressure. The products are then stripped from the line, typically by launching a batch pig from the launcher 18 and filling the line with water. This purges the line of dangerous liquid products. After the liquid product has been evacuated or has been displaced by water, the pipeline is repaired or modified without risk of serious damage to ecology or to human life. Both procedures, i.e., complete evacuation and displacement of product by water, are time consuming and are rendered unnecessary by the method and apparatus of the present invention.

Figure 2:
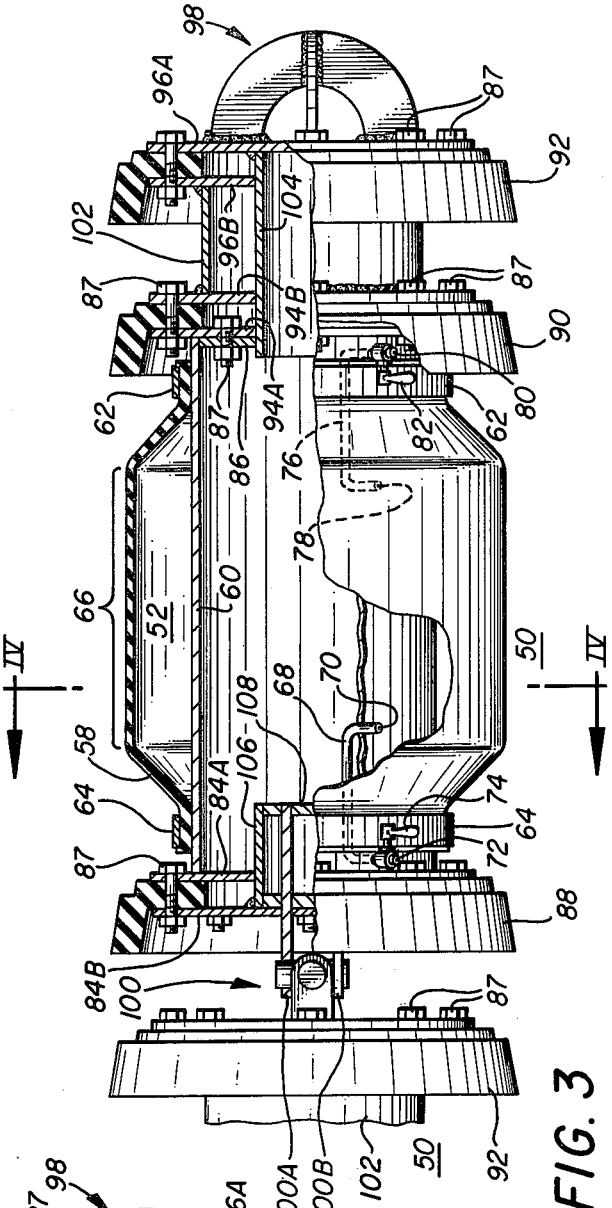
FIG. 2 is a perspective view of a freeze pig constructed according to the principles of the present invention.
Figure 3:
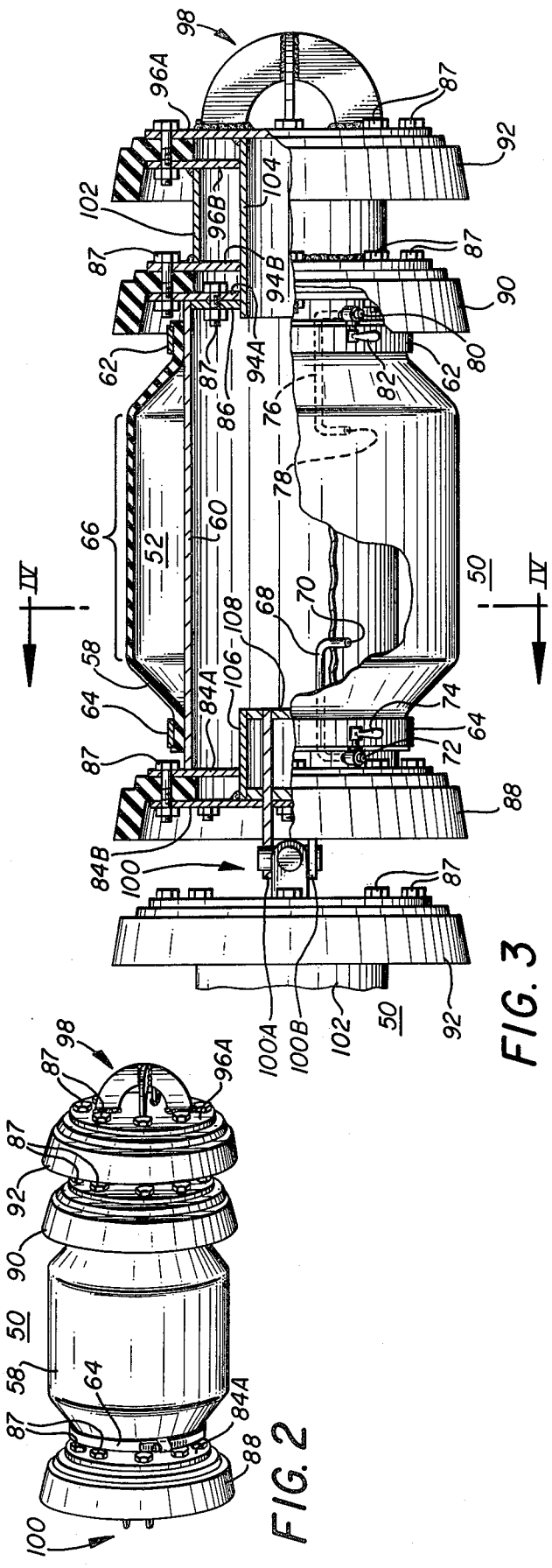
FIG. 3 is a side elevation view, partially broken away and partially in section, of the freeze pig shown in FIG. 2.

According to the method of the present invention, the testing, repair and modification of a pipeline section, e.g., section 26, can be carried out without evacuating products from the pipeline. This is accomplished by selectively sealing the fluid transmission pipeline section to prevent the flow of product with a pipeline freeze pig 50 as shown in FIGS. 2 and 3 of the drawing. The freeze pig 50 features an expandable chamber 52 which is filled with water 54 or some other liquid solution which expands upon freezing. The pipeline section 26 is sealed by positioning the freeze pig 50 within the fluid transmission line section and positioning a refrigeration unit around the section of fluid transmission line enclosing the freeze pig 50. The water within the expandable chamber 52 is frozen by circulating a refrigerant through the the refrigeration unit 56. The volume of the expandable chamber 52 increases by approximately ten percent as the confined water freezes.

Referring now to FIG. 3 of the drawing, the freeze pig 50 is characterized by a resilient boot which is concentrically disposed about and secured to an elongated support beam 60. The resilient boot 58 is sealed to the support beam 60 at opposite ends by means of compression bands 62, 64. The combination of the resilient boot 58 with the support beam 60 defines the expandable annular chamber 52.

As can best be seen in FIG. 3, the resilient boot 58 preferably comprises a cylindrical wall 66 which extends axially for at least 12 inches for engagement with the interior wall surface of the pipeline section 26. The resilient boot 58 is flexible and radially yieldable in response to the force exerted by the expansion of a volume of water or other freezable liquid product contained within the expandable chamber 52 as the water freezes to cause sealing engagement of the cylindrical wall surface 66 with the inner wall surface of the transmission line 26.

The resilient boot 58 preferably comprises a synthetic resin or synthetic rubber which is suitable for low temperature, high pressure service. A synthetic butyl resin such as NYTRAL, which is a trademark of B. F. Goodrich Corporation is preferred for the construction of the resilient boot for a freeze pig 50 which is used in a pipeline which transports crude petroleum. However, other synthetic resin or rubber compositions may be used to good advantage. The type of material comprising the resilient boot 58 should be chemically compatible with the product to which it will be exposed. The following synthetic resin and rubber compounds may be used to good advantage for various product applications:

| | |
|---|---|
| polyvinylchloride | chlorosulfonated polyethylene (Hypalon) |
| polyvinylchloride acetate | neoprene (polychloaprene) |
| polyester styrene-alkyd | phenolics (modified) |
| polyamine | acrylon |
| polyurethane | acrylonitrilebutadienestyrene (ABS) |
| styrene-butadiene (buna-S) | synthetic rubbers (GR-A) |
| chlorotrifluoroethylene (kill-F) | NICAR (nitrate-carbon composition) |
| polyvinylidene fluoride | butylrubber |
| polysulfide rubber (GR-P) | isobutyleneisoprene (GR-1) |

Referring again to FIG. 3, a fill line 68 is provided for pressurizing the expandable chamber 52 with water. The fill line 68 has a discharge port 70 connected in fluid communication with the expandable chamber, an inlet port 72 for admitting water under pressure, and a valve 74 connected to selectively open or close the fill line 68. A vent line 76 is disposed on the opposite end of the freeze pig having an inlet port 78 connected in fluid communication with the expandable chamber 52, a discharge port 80 and a vent valve 82 connected to selectively open and close the vent line during a filling operation. The expandable chamber 52 is filled and the resilient boot 58 is pressurized by admitting water under pressure through the fill line 68 until the resilient boot 58 has expanded to a diameter which is substantially equal to the pipeline inside diameter. The vent valve 82 is opened from time to time as the expandable chamber 52 is being filled with water in order to permit the escape of trapped air. After all of the trapped air has been removed from the expandable chamber 52, the resilient boot 58 is pressurized with additional water to increase its diameter to fit snugly within the inside diameter of the pipeline section 26.

The support beam 60 is preferably a cylindrical shell made of high strength material such as steel which is capable of withstanding high collapse pressures. The support beam 60 is welded at one end to a support plate 84 and at the opposite end it is bolted to a centering plate 86. According to an important feature of the invention, first and second flexible sealing flanges 88, 90 are coupled to the support beam 60 and project radially therefrom for wiping engagement with the inner wall surface of the transmission line. One or more additional sealing flanges may also be provided if desired. This arrangement isolates the resilient boot 58 with respect to product on either side of the sealing flanges 88,90 which prevents the establishment of convection currents outwardly of the freeze zone and thereby substantially reduces the time required to freeze the water within the boot.

The centering plate 86 is firmly secured to a support plate 94A by means of the bolts 87. The sealing flanges are of annular construction and are sandwiched between the support plates 84A and 84B, 94A, 94B and 96A, 96B.

Figure 8:
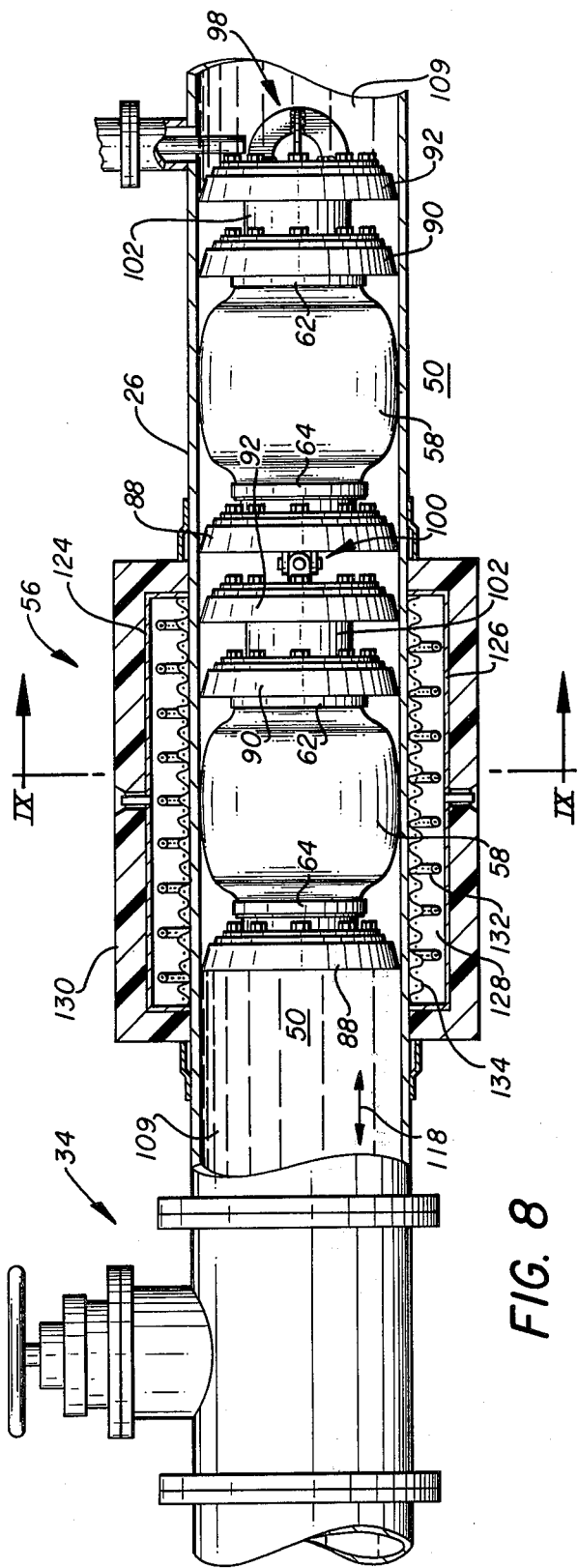
FIG. 8 is an elevation view of a portion of the pipeline section shown in FIG. 7 which illustrates the relationship between the refrigeration unit and freeze pig.
Figure 4:
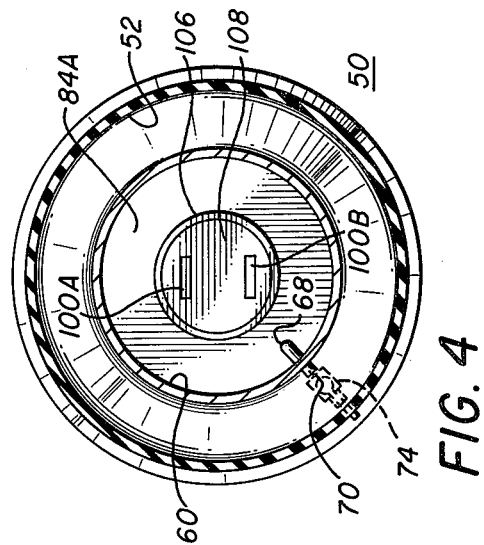
FIG. 4 is a sectional view of the freeze pig shown in FIG. 3 taken along the lines IV—IV.
Figure 9:
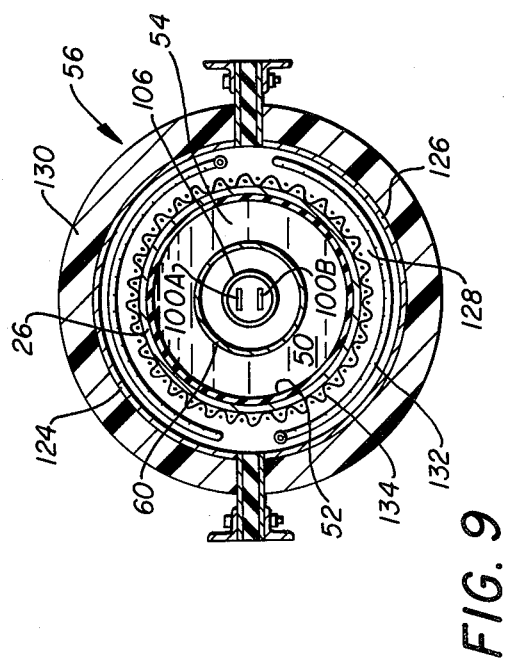
FIG. 9 is a sectional view taken through the lines IX—IX of FIG. 8.

A conventional bumper assembly 98 is secured to the support plate 96A on the forward end of the freeze pig 50 and a universal coupling joint assembly 100 is secured to the opposite end for coupling attachment of a second freeze pig 50 if desired. It is preferable to use the pigs in pairs as shown in FIG. 8 of the drawing in order to provide greater flexibility in the location of the refrigeration unit 56 with respect to the main line valve 34 or other pipeline components. Additionally, the use of two freeze pigs provides a measure of protection by redundancy in the event one freeze pig should fail because of a leak in its resilient boot. The provision of the universal coupling joint assembly 100 permits the tandem pair of freeze pigs 50 to pass through both vertical and horizontal curves more easily by being able to "bend" at the middle.

The sealing flanges 90, 92 are spaced with respect to each other by means of concentric reinforcing cylinders 102, 104. The support plates 84A, 84B are reinforced by means of a reinforcing cylinder 106. The support beam, the support plates and the reinforcing cylinders are preferably welded together to form a rigid structure.

Referring now to FIGS. 5, 6 and 7, the method of the invention will be explained in connection with the replacement, repair or modification of the main line valve 34 which is disposed in the transmission pipeline 26. As can be seen in FIG. 5, the transmission pipeline 26 is filled with a volume of liquid product 109 which may be, for example, crude oil, and it is not necessary according to the method of the invention to evacuate the liquid product or displace it with water. The main line valve 34 which is to be repaired, modified or replaced is isolated by positioning freeze pigs 50 downstream and upstream relative to the valve. First and second pairs of freeze pig assemblies 110 and 112, respectively, are inserted into the launcher-receiver 30 and are propelled by pumps or compressors (not shown) through the pipeline 26 until the leading freeze pig assembly 110 engages the partially closed gate (not shown) of the main line valve 34. The gate of the main line valve 34 is partially closed to engage the bumper assembly 98 of the leading freeze pig 50 and thereby restrain the freeze pig assembly 110 against further movement. The trailing freeze pig assembly 112 is propelled into engagement with the leading freeze pig assembly.

According to an important feature of the invention, the trailing freeze pig assembly 112 is restrained against further movement through the transmission line 26 by means of a pig stop rod 114 which is movable into the interior of the pipeline 26 by means of a pig stop valve assembly 116. The pig stop valve assembly is located at a measured distance with respect to the centerline of the main line valve in order to locate the pig stop rod in the space 118 which lies intermediate the first and second freeze pig assemblies. After the pig stop rod is inserted into the intermediate pipeline space 118 to restrain further movement of the trailing freeze pig assembly 112, the gate of the main line valve 34 is fully opened and the product 109 is pumped through a bypass line 120 through a similar pig stop valve assembly 116 disposed downstream of the main line valve 34. The product 109 is pumped through the upstream pig stop valve assembly 116 and discharged into the intermediate pipeline space 118. The pressurized product propels the leading freeze pig assembly 110 past the main line valve 34 and into engagement with the pig stop rod 114 disposed in the downstream pig stop valve assembly 116 as shown in FIGS. 6 and 7. The pressure exerted by the product 109 as it is pumped into the intervening pipeline space 118 propels the leading freeze pig assembly 110 through the transmission line and past the main line valve until it is restrained by engagement with the downstream pig stop valve 114. Thereafter, the upstream pig stop valve is closed to maintain the pressure on the downstream freeze pig.

Suitable refrigeration units 56 are then secured around the pipeline over the downstream freeze pig assembly and over the upstream freeze pig assembly to freeze the water in the expandable boot of the freeze pigs and thereby seal the pipeline interior on either side of the main line valve as can best be seen in FIG. 7 of the drawing. The foregoing operations are all carried out without removing the product 109 from the transmission line. Thereafter, the isolated section of the pipeline lying intermediate the seals established by the frozen pigs is penetrated by a tool for performing the modification, repair or replacement of the valve 34.

Positioning of the freeze pig assemblies on either side of a defective section of pipe which does not include a valve or other component extending into the interior of the pipe for restraining the leading freeze pig assembly may be carried out by attaching first and second pig stop valve assemblies to the pipeline at spaced positions corresponding to the axial dimension of the leading freeze pig assembly upstream relative to the defective section of pipe, and by attaching a third pig stop valve assembly to the pipeline at a point downstream relative to the defective section of pipe. Pig stop rods are inserted through the valve assemblies to first restrain the leading and trailing freeze pig assemblies upstream of the defective section and then restrain the trailing freeze pig assembly upstream while permitting the leading freeze pig assembly to be propelled into engagement with the downstream pig stop rod. A bypass line and pump is connected betwen the upstream and downstream pig stop assemblies to pressurize the intervening space between the freeze pig assemblies and thereby propel the leading freeze pig assembly into engagement with the downstream pig stop rod.

After the main line valve 34 has been isolated by the frozen pigs, the repair or modification procedure can begin. The seal provided by the frozen pigs will hold back any head or back pressure that is on the line 26 and will prevent a major spill which might otherwise endanger the local ecology. The main line valve 34 is easily removed from the line when it is coupled thereto by means of coupling flange assemblies 120, 122. However, in some instances it will be necessary to penetrate the pipeline 26 by means of a cutting torch. If the product in the pipeline is flammable, penetration of the pipe should be performed by mechanical pipe cutters. After the pipeline has been cut, the defective component main line valve 34 may then be lifted out of the existing pipeline 26. Since the seal provided by the frozen pigs is located very near the main line valve 34, often as close as 10 feet, the amount of product confined between the frozen pigs which is lost when the pipeline section is severed is reduced to a minimum. The lost liquid product consists of only the capacity of the 20 to 30 feet lying between the frozen pigs. As the frozen pigs hold the liquid product in place in the pipeline 26, a new section of pipeline having a new, repaired or modified main line valve 34 which has been previously hydrostatically tested may be installed into the line. Therefore, as the section to be repaired is removed, the new or replacement section can be immediately installed into the pipeline and the welding of the installation can commence, thereby minimizing the length of time that the pipeline is out of service. The welds are inspected by conventional X-ray techniques, and the pipe is wrapped and covered.

The pipeline section can be tested for leaks while the product is in the pipeline by sealing the pipeline with the freeze pig 50 on at least one side of the test section. For example, two freeze pigs may be located on opposite sides of the section containing the main line valve 34 as shown in FIG. 6. A relatively high test pressure is maintained on one side of a frozen pig while a relatively lower back pressure is maintained on the other side. The pipeline is pressurized with product to maintain the relatively high test pressure. Variation in the high test pressure relative to the back pressure during a test period indicates the existence of a leak in the test section. The high test pressure is maintained well below the minimum rated yield strength of the pipeline in order to prevent inadvertent rupture of the line but is maintained high enough to provide test data which may be interpreted with confidence.

The exact location of a freeze pig within the pipeline can be determined by a number of conventional techniques including acoustic, radioactive rays, infra-red, magnetic, radio signals or X-ray detecting equipment. Once the pigs are positioned and restrained at the desired location, the refrigeration unit 56 is installed around the pipeline section preferably centered with the resilient boot 58 of the freeze pig. The refrigeration unit is preferably constructed as shown in FIG. 8 and as described in co-pending U.S. patent application Ser. No. 722,665, filed Sept. 13, 1976 by Beryle D. Brister, which is hereby incorporated by reference. According to that disclosure, the refrigeration unit 56 preferably comprises cylindrical halves or shells 124, 126 which are assembled in concentric relation around the pipeline 26 to define an annular chamber 128 for containing the refrigerant. A layer 130 of thermal insulation is disposed on the outer surfaces of the cylindrical shells 124, 126. Fluid distribution conduits 132 are disposed within the annular cooling chamber 128 for discharging refrigerant into the cooling chamber and distributing the refrigerant substantially uniformly over the enclosed exterior surface of the transmission line. A diffusion screen 134 is wrapped around the the transmission line to promote nucleate boiling and to uniformly distribute the refrigerant over the surface of the transmission line. A preferred refrigerant is liquid nitrogen which is discharged into the cooling chamber 128. During the exchange of heat from the water contained within the resilient boot 58 of the freeze pig to the refrigerant contained within the annular cooling chamber 128, large volumes of liquid refrigerant will evaporate and form vapor. The vapor is exhausted from the cooling chamber 128 into the surrounding atmosphere.

An analytical study has been performed which clearly indicates that the stresses which develop within the pipe section during the freezing procedure do not have a detrimental effect on the structural integrity or pressure load capacity of the pipe. Estimates of pipe stress is based on finite difference calculations involving the behavior of a mathematical model in response to boundary conditions associated with the freezing procedure were consistent with known exact solutions of idealized freezing processes. In particular the hoop stresses or tangential stresses were found to decrease due to the freezing process in the near vicinity of the freeze zone. Since hoop stresses limit the pressure load capacity of the pipe, the diminished hoop stress effect is a favorable effect on the freezing process. Axial stresses were found to increase due to the longitudinal bending moment created by the temperature gradients. However, the axial stress was not considered to be significant since longitudinal stresses due to pressure loading are substantially less than hoop stresses; therefore, the pressure load capacity of the pipeline would only be effective for very steep axial temperature gradients. The bending stresses generated in the freeze zone effect the pressure load capacity substantially less than membrane stresses because of the allowable variation of bending stresses from the inside wall to the outside wall. For example, according to ASME Boiler and Pressure Vessel Standards, Section III, Division I, as much as 1.5 times higher stresses are allowed for section bending stresses as compared to the membrane stresses. The effect of the longitudinal bending stresses are not due to sustained loading but last for the relatively short duration of the freezing process. Therefore its influence on pressure load capacity is not significant.

Field experience and laboratory testing have confirmed that the properties of the pipe frozen by the method and apparatus of the present invention are not altered in any way. In a recent test program, test specimens were removed from an unpressurized section, a pressurized section, and from a frozen section and were subjected to standard tension tests, impact tests, and metallographic examinations. The tension test data revealed only normal scatter at all three locations. The impact test data revealed no shift of transition temperature; the data from all tests fell within a normal scatter band. The microstructures at all locations were found to be similar, consisting of laminar pearlite in a matrix of ferrite, with a low level of non-metallic inclusions. No microfissures or any other unusual structural conditions were detected.

For reasons that are not entirely understood, ice can sustain extremely high pressures which cannot be predicted by an analysis of the properties of ice. For instance, it has been found that in a twenty-six inch OD piece an ice plug frozen therein successfully withstood pressures in excess of 1,800 pounds PSI wherein a total longitudinal stress of approximately 900,000 pounds was exerted. While the upper limit of thrust loading which the freeze pig of the present invention will withstand has not yet been determined, the sealing engagement formed by the expansion of the volume of water in the chamber 52 is sufficiently great to be used with confidence in standard pipeline hydrostatic testing procedures. The seal is enhanced somewhat by the slight radial contraction of the pipeline walls as they are exposed to cyrogenic temperatures. For example, a thirty inch diameter section of pipeline will contract radially to reduce its circumference by approximately 0.25 inch, and a ten inch diameter line will contract by approximately two millimeters in circumference at cyrogenic temperatures.

After a successful test or repair operation, the refrigeration units are removed from the pipeline and the freeze pigs are allowed to thaw. Field experience has shown that the pigs will thaw enough to be propelled through the line within about 15 minutes after the refrigeration units have been removed. Thereafter, the pigs may be removed from the line by propelling them with pressurized product, or they may be advanced to another position along the line for further testing or repair operations.

From the foregoing description of preferred embodiments those skilled in the art will appreciate that the present invention provides method and apparatus for forming a pipeline seal much faster and with greater confidence than with conventional arrangements, and without purging product from the line. Although preferred embodiments of the invention have been described in detail, it should be understood that various changes and alterations can be made therein without departing from the spirit and scope of the invention as defined by the appended claims.

What is claimed is:

1. A method for sealing a section of a fluid transmission line comprising the steps:
    positioning within the interior of the fluid transmission line section a freeze pig having a sealed expandable boot filled with a quantity of a liquid solution which expands when frozen;
    positioning refrigeration means around the section of fluid transmission line enclosing the pig; and
    freezing the liquid solution within the expandable boot by introducing a refrigerant into said refrigeration means to cause said boot to expand into sealing engagement with the interior wall of said transmission line.

2. A method for isolating a pipeline component in a pipeline section which is filled with a fluid product comprising the steps:
    inserting into the interior of the pipeline section first and second freeze pigs each having a sealed expandable boot filled with a quantity of a liquid solution which expands when frozen;
    positioning said freeze pigs upstream and downstream, respectively, relative to said pipeline component;
    positioning refrigeration means around the pipeline sections enclosing said pigs; and
    freezing the liquid solution within the expandable boot of each freeze pig by introducing a refrigerant into said refrigeration means to cause each boot to expand into sealing engagement with the interior wall of said transmission line.

3. The isolation method as defined in claim 2 wherein said pipeline component is a defective section of pipe, said positioning step comprising:
    attaching first and second pig stop valve assemblies to the pipeline at spaced positions corresponding to the axial dimension of the leading freeze pig upstream relative to the defective section of pipe;
    inserting a pig stop rod into the interior of the pipeline section through the second pig stop assembly located nearest the defective section;
    attaching a third pig stop valve assembly to the pipeline at a point downstream relative to the defective section of pipe;
    inserting a pig stop rod into the interior of the pipeline section through the third pig stop assembly;
    propelling the first and second freeze pigs through said pipeline until the leading freeze pig is restrained by the upstream pig stop rod;
    inserting a pig stop rod into the interior of the pipeline section through the first pig stop assembly disposed intermediate the first and second freeze pigs;
    withdrawing the pig stop rod which restrains downstream axial movement of the leading freeze pig;
    pumping product into the pipeline section intermediate the first and second freeze pigs to propel the leading freeze pig through the defective pipeline section and into engagement with the downstream pig stop rod.

4. A method for isolating a main line valve in a pipeline section which is filled with a fluid product comprising the steps:
    inserting into the interior of the pipeline section first and second freeze pigs each having an expandable boot filled with a liquid solution which expands when frozen;

closing the main line valve to partially obscure the fluid flow path through said valve;

propelling the first and second freeze pigs through said pipeline until the leading freeze pig is restrained by the partially closed main line valve;

inserting a pig stop rod into said pipeline section at a point intermediate the first and second freeze pigs to restrain downstream movement of said trailing pig;

inserting a pig stop rod into said pipeline section at a point downstream of said main line valve;

opening said main line valve fully to permit passage of the leading freeze pig;

pumping product into the pipeline section intermediate the pigs to propel the leading freeze pig through said valve and into engagement with the downstream pig stop rod;

positioning refrigeration means around the pipeline sections enclosing said pigs; and freezing the liquid solution within the expandable boot of each freeze pig by introducing a refrigerant into said refrigeration means.

* * * * *